Figures 2, 4:
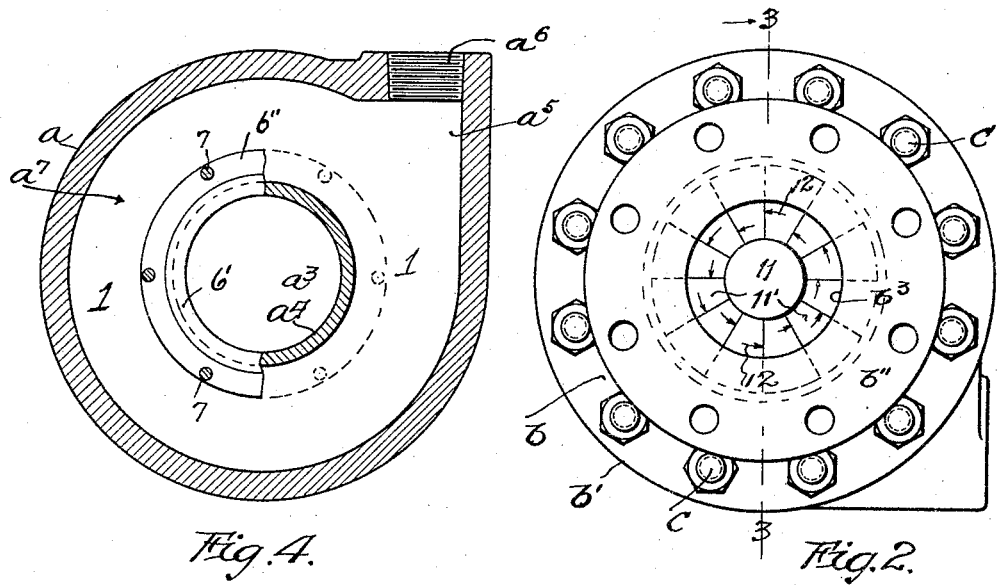

Feb. 7, 1933.  C. G. HAWLEY  1,896,896

STEAM SEPARATOR

Filed Feb. 5, 1929

INVENTOR
CHARLES G. HAWLEY.
BY Mason & Mason,
ATTORNEYS.

Patented Feb. 7, 1933

1,896,896

UNITED STATES PATENT OFFICE

CHARLES GILBERT HAWLEY OF CHICAGO, ILLINOIS, ASSIGNOR TO CENTRIFIX CORPORATION, OF CLEVELAND, OHIO, A CORPORATION OF OHIO

STEAM SEPARATOR

Application filed February 5, 1929. Serial No. 337,597.

The invention relates to improvements in the art of separating various substances from fluid streams, and the invention comprises a separator adapted for inclusion in fluid lines or pipes; more particularly, such as are used for the conveyance of steam, from which the moisture is to be removed.

Such flowing fluids are known as "carriers"; meaning any fluid that is directed or kept in motion between given points; whether liquid, gaseous or vaporous and whether hot or cold, or a mixture; and, the terms foreign or entrained substances are to be understood as meaning any and all carrier conveyed matters, whether solid or fluid, and of less or greater weight than the carrier. The condition and shape of such particles often permit them to be centrifugally separated, as herein provided, even though of less weight than the carrier.

The objects of the invention are to provide a separator which shall be adapted for direct inclusion in a carrier line or pipe; which shall offer little resistance to the flow of carrier therein; which shall comprise a minimum number of parts and all of simple construction; which shall comprise only fixed or stationary parts and be free from rotating parts; which shall be effective to remove substantially all the foreign substances from the carrier and to discharge the same from the line; which shall be of small size, weight and cost as compared with other separators of approximate capacities and efficiencies; which shall be durable and strong; which shall be shippable and installable as a single unit; which shall be substantially self-cleaning; and, adapted for easy dismemberment and removal from the line.

This separator is of a centrifugal type. That is, upon entering the same the fluid is caused to rotate rapidly and to project the heavier substances against an internal or restraining wall. The heavier substances are collected and removed from that wall while the purified fluid departs freely from the outlet of the separator.

Importantly, this separator is composed of co-axial members which are in axial alignment with the carrier pipe served thereby. The fluid movement proceeds from the inlet of the separator directly to the outlet; the linear movement of the fluid being modified only by a whirling action which is imparted thereto and which reliably effects a centrifugal separation of the foreign substances before said outlet is reached.

This application should be classified with my pending application Serial No. 236,519, filed November 29, 1927, and with my companion application Serial No. 337,596, entitled, Dust separator, filed February 5, 1929.

On reference thereto it will be seen that a separator of this type, and as typified in the foregoing paragraph, provides for the separation of the foreign substances within a brief instant of time and during a very short linear travel of the carrier, and, without changing the linear direction of that travel. This is accomplished by setting the carrier into rapid rotation during the brief instant referred to and thereby ensuring a centrifugal separation of the foreign substances. Such separation implies or involves the discharge of the separated substances from the periphery of the chamber in which the separation is accomplished. At the same time it involves the spiral movement of both carrier and the substances toward the opening through which the discharge is effected.

For various reasons, the separating chamber is larger than the carrier outlet and the spiral movement referred to is necessarily modified as that outlet is approached. The actual separation takes place at that time or point.

Aforesaid applications, and this present invention, provide against the difficulty of accomplishing complete separation in so brief an instant by enabling the immediate discharge of the greater part of the separated substances and by then using the residual whirling motion within the separating chamber to perform a subsequent separating action immediately in advance of the separator outlet, thus caring for any residue of foreign substances which is not cared for by the major separating action.

Aforesaid applications, in providing for two separations and being suited to the separation of dusts entail the use of two collecting pockets or traps, one for each part of the separator, to receive the major and minor collections. In dealing with steam, compressed air and the like, from which liquids are to be removed, it should be possible to accomplish the described successive or repeated separating actions and yet successfully merge or join the ejected streams so that the total of foreign substances may be disposed of through a single collecting pocket or trap. In brief, for such uses it is desirable that the separator shall have only one external eject opening and shall be served by a single trap. This is the outstanding object of the present invention as contrasted with the subject matters of aforesaid applications. Still further objects will appear hereinafter.

Figures 1, 3:
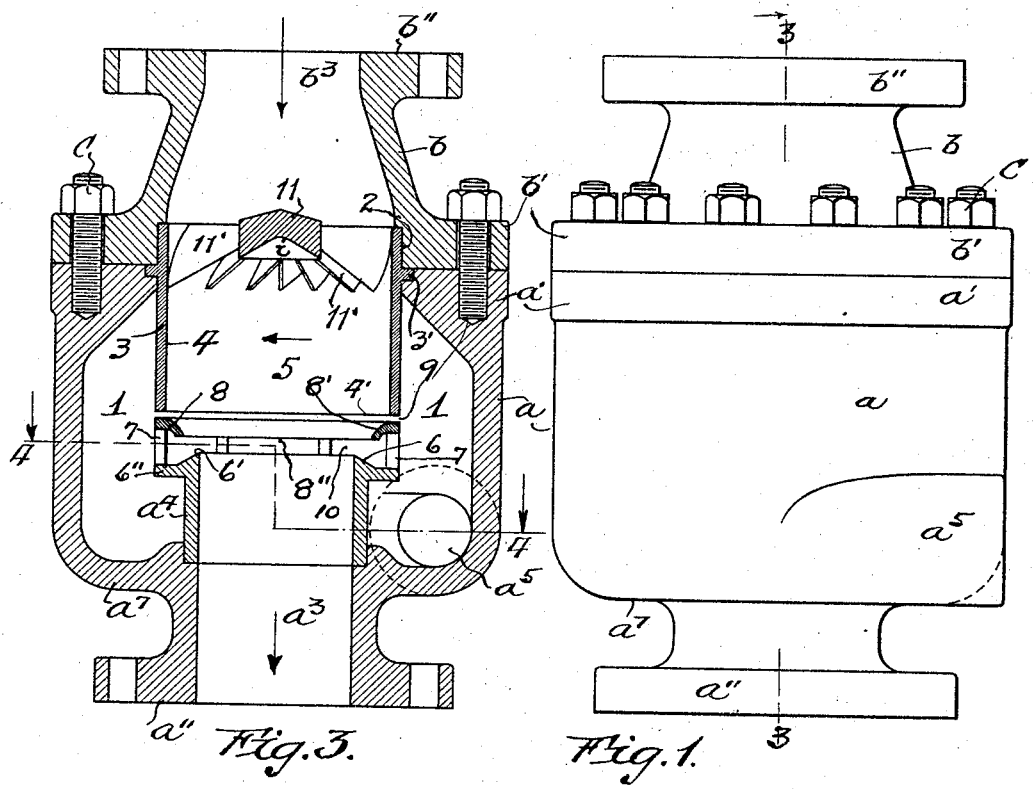

The invention as a whole and its several parts and elements will be described by reference to the accompanying drawing; wherein,—Fig. 1 is a side view of the novel separator; Fig. 2 is a view of the inlet end thereof; Fig. 3 is a longitudinal section, on the line 3—3 of Figs. 1 and 2; and, Fig. 4 is a cross-section on the irregular line 4—4 of Fig. 3.

The foregoing objects are all attained in, and the invention comprises, a line separator of the construction herein illustrated or typified.

The casing of this device comprises two parts $a$ and $b$ which have flanges $a'$ and $b'$ jointed and fastened together by bolts $c$ so that they form a single tight casing.

The part $b$ is termed the inlet bell and has a flange $b''$ for connecting it to a carrier pipe of a size which corresponds to the opening $b^3$.

The part $a$ is termed the body of the separator and terminates in a flange $a''$ which contains a part of the central outlet $a^3$ of the separator. The remainder of that outlet or bore is found in the standpipe portion $a^4$ which rises or extends into the large chamber 1 which the body of the separator contains.

The ultimate eject opening of the separator, provided for the drainage or discharge of the foreign substances, preferably takes the form of a tangential nozzle $a^5$, which terminates in a thread $a^6$ for the reception of the collecting pocket or trap connection. The latter is usually an automatic steam trap, of which many kinds are available.

The portion $a^4$ may be integral with the body $a$. For the sake of clearness it is here shown as a separate sleeve but tightly jointed to the bottom $a^7$ of the casing.

The parts $a'$ and $b'$ are of greater internal diameter than the opening $a^3$; and, provide a seat 2 which receives the end of the cylindrical shell 3. The latter is shouldered at 3' and it is fixed rigidly by and between the two parts of the casing. It may be additionally keyed, for it must not rotate.

The sleeve 3 extends within the chamber 1 and presents an internal cylindrical surface 4, thus forming the cylindrical separating chamber 5 of the separator. The term cylindrical as herein employed signified an easily machined surface 4, and any departure therefrom lessens the efficiency of the separator.

As shown, the chamber 5 is of somewhat greater diameter than the outlet $a^3$ and is coaxial therewith. Its inner end 4' is opposed to and is spaced from the inner end 6 of the part $a^4$.

That end 6 is machined as a cone and thus presents a relatively sharp lip 6' as the margin of the outlet $a^3$. The flange proper 6'' forms the base of the cone 6' and the diameter of the flange 6'' is substantially the same as the external diameter of the sleeve 3.

Upstanding upon the flange 6'' is a circular series of lugs or spacers 7 which support a shoulder ring 8, preferably of the same outside diameter as the sleeve 3. The surface 8' of the ring 8 is curved and converges radially toward the outlet $a^3$, that is, toward the lip 6'. The ring 8 is spaced from the sleeve end 4' and therewith forms a narrow eject slot 9. The smallest internal diameter of the ring 8 is considerably greater than the diameter of the outlet $a^3$, and the inner edge 8'' of the ring is longitudinally spaced from the lip 6'. Briefly, the width of the space or circumferential slot 10 thus provided between the parts 8 and 6' is greater than the width of the slot 9. The purpose thereof will be explained in detail.

The length of the chamber 5 about equals its diameter, and by the means described its wall is perforated at two points both closely adjacent the separator outlet $a^3$, as marked by the lip 6'. Obviously the perforations comprise the narrow circumferential slot 9 and the wider circumferential slot 10, both of which are in free communication with the large chamber 1 within the body $a$ of the casing.

The member which is interposed between the inlet $b^3$ and the chamber 5 is a whirl producing tuyère by which the carrier fluid moving from the inlet toward the outlet $a^3$ is set into rapid rotation in advance of the circumferential slots or parts 9 and 10, and hence in advance of the parts 8 and 6'. Preferably this tuyère is lodged or fixed within the inlet end of the sleeve 3 so that it is substantially a unitary part thereof and jointly therewith is held between the parts $a$ and $b$ of the casing.

This tuyère preferably comprises the central portion 11 together with a plurality of blades 11' and the upper portion of the sleeve 3. Instead of being imparted by a rotating part, the rotation or whirling action of the carrier is brought about or induced by disposing the fixed blades 11' angularly in the path of the carrier fluid. All blades have a common direction; as shown by the arrows 12 in Fig. 2. Incidentally the direction of the tangential eject nozzle $a^5$ is consistent with the rotative direction indicated by said arrows.

A blade inclination of forty-five degrees is sufficient and the aggregate available area of the passage which they afford between the part 11 and the wall 4 need be only slightly, if any, greater than the area of the outlet $a^3$. The opposition of the blades to the moving carrier results in very little loss of pressure (pressure drop) in the separator and yet due to their presence the carrier is set into very rapid rotation in the chamber 5.

In consequence of such rotation the foreign substances are projected spirally against the wall 4 and upon reaching the shoulder ring 8 are whirlingly propelled and ejected through the narrow slot 9. The carrier fluid whirls longitudinally across the circumferential ring 8 and escapes through the outlet $a^3$. Meantime the escaping or stray substances which failed of ejection at 9 are crowded past the ring 8 and are whirlingly ejected through the space or wider slot 10. The angled lip 6' meets or intercepts the peripheral portion of the whirling body of carrier fluid and tends to keep the outlying chamber constantly filled with carrier at a high pressure; which ensures the ejection of the collected substances through the nozzle $a^5$. Hence the term pressure effecting lip, as used in describing the part 6'. The described pressure effecting function of the related parts 8 and 6' is also a distinct aid in the matter of the balancing of the forces in action at the two slots 9 and 10, as hereinafter discussed.

It will now be apparent that foreign substances are ejected from the chamber 5 and enter the collection chamber 1 through two separate passages; and those who are skilled in the art will at once perceive that the ejection forces are not equal at those points. Because of these differences it woud seem to be difficult to unify the ejected foreign substances and to accomplish the discharge thereof through a single chamber 1 and nozzle $a^5$. Indeed the tendency is toward a disturbed condition in the chamber 1, and a flow of carrier fluid which if not controlled would promptly sweep the greater part of the substances from the chamber 1 and back into the outlet $a^3$, across the marginal lip 6'. Such wrong action is prevented by the presence of the ring 8 and the spacing thereof more closely to the sleeve 3 than to the lip 6'.

Much of the whirling force of carrier and substances is expended against the shoulder ring 8 and a definite expulsive force results to ensure the ejection of the centrifugally separated substances. Obviously the expulsive force developed at the slot 9 is greater than that developed at the slot 10, due to the lesser internal diameter of the latter and the preliminary expenditure of forces which occurs in advance of the slot 10. The unbalanced condition tends to result in a definite movement of carrier fluid into the chamber 1 from whence it could only escape through the slot 10.

If permitted such movement would defeat the expected action of the separator, and hence the unequal spacing of the ring 8 with respect to the parts 4' and 6' is of great importance. By reason thereof and because of the large internal diameter of the ring 8 with respect to the outlet $a^3$, the ejecting forces are so balanced as to effectively prevent or obviate the inrush and outrush of carrier fluid through the chamber 1 and thus the foreign substances delivered to the chamber 1 are retained therein and permitted to drain away through the nozzle $a^5$.

The centrifugal forces which are localized at the two circumferential slots, though differing in degree or intensity, are equalized in effect upon the content of the chamber 1, by limiting the area of the initial slot 9 and by the making of the area of the slot 10 much greater, so that the forces expended through the slot (10) of the lesser diameter shall in the aggregate substantially equal the more vigorous forces expended through the cramped or narrow initial slot.

Further, a slight dissipation of carrier fluid through the narrow slot 9 is permitted to occur without materially interfering with the secondary separation because the relatively great width, and hence the effective area, of the slot 10 permits the momentarily entrapped carrier fluid to leave the chamber 1 in so expanded a condition and at such low velocity that while emerging through the slot 10 to join the carrier fluid in the outlet $a^3$ it does not materially interfere with the centrifugal expulsion of the stray substances through the slot 10.

This separator is adapted for use in vertical position, as here shown, or in horizontal position. In both cases the nozzle $a^5$ is placed at the bottom to ensure prompt drainage.

It is of particular advantage that the upstanding part $a^4$ affords the bottom of the chamber 1 considerable capacity when the separator is used in vertical position; and, that the diameter and length of the chamber 1 afford a like retention capacity for foreign substances when the separator is used upon its side, that is, in horizontal position.

A separator of the construction here exemplified and as contrasted with other line separators of approximately equal capacities has many advantages which will become apparent to the users thereof; and in particular it is to be noted that the expenditure of energy therein is very small. This is of great importance, for as well known a line separator should operate with high efficiency here indicated and yet occasion the least possible drop of pressure between its inlet and outlet.

Intended primarily for the purification or cleaning of steam and compressed air this separator operates to remove both liquids and solids; and, is of general utility in carrier lines of all kinds.

It has been thought unnecessary to illustrate the pocket or trap which is connected with this separator to receive the foreign substances therefrom. Such pocket or trap may be any of the ordinary kinds employed with line separators.

A tuyère of the kind herein employed is separately described and claimed in my companion application entitled Whirl-promoting tuyère for separators, Serial No. 337,598, filed February 5, 1929.

Having thus described my invention, I claim as new and desire to secure by Letters Patent:

1. A separator of the fixed downgoing centrifugal type, comprising a cylindrical separating chamber, in combination with a whirl-promoting tuyère co-axially fixed in and forming the inlet of said chamber, the other end of said chamber containing a central outlet of less internal diameter than said chamber, the wall of said chamber containing two circumferential eject slots adjacent said outlet and leading laterally from said chamber, an inwardly projecting circumferential ring positioned between and substantially separating said slots and containing a central opening which is concentric with but of greater diameter than said outlet, and a reception chamber enclosing said slots and itself having an eject nozzle.

2. A separator of the fixed centrifugal type, comprising a cylindrical separating chamber, in combination with a whirl-promoting tuyère co-axially fixed in and forming the inlet of said chamber, the other end of said chamber containing a central outlet of less internal diameter than said chamber, a circumferential slot leading laterally from said chamber adjacent said outlet, said chamber having a shoulder ring which converges radially toward said outlet between the same and said slot, and a reception chamber enclosing said slot and itself having an eject nozzle.

3. A line separator of the fixed centrifugal type, comprising a casing and means forming therein an inner separating chamber of less diameter than said casing, in combination with a whirl-promoting tuyère fixed within said casing and forming the inlet of said inner chamber, the other end of said casing containing a central outlet of less internal diameter than said chamber, two peripheral eject passages adjacent said outlet and leading laterally from said chamber, a circumferential ring shouldered inwardly from the wall of said chamber between said passages and containing an opening which is concentric with but of greater diameter than said outlet, the first of said passages being of less width than the second, and a reception chamber remaining within said casing and in communication with both said passages and itself having a single eject which is common to said passages.

4. A separator of the fixed centrifugal type comprising a casing having an inlet at one end and an outlet at the other and forming an eject reception chamber which terminates in an eject nozzle, in combination with a cylindrical sleeve fixed in said casing of less diameter than said eject chamber but larger than and coaxial with said outlet, a whirl-promoting tuyère positioned at the inlet end of said sleeve, said sleeve having its outlet end spaced from said outlet, and a shoulder ring coaxial with said sleeve and outlet and spaced from both thereof and therewith completing two circumferential eject slots which open into said eject chamber.

5. A separator of the fixed centrifugal type comprising a casing having an inlet at one end and an outlet at the other and forming a reception chamber which terminates in an eject nozzle, in combination with a cylindrical sleeve fixed in said casing of less diameter than said chamber but larger than and coaxial with said outlet, a whirl-promoting tuyère positioned at the inlet end of said sleeve, said sleeve having its outer end spaced from said outlet, and a shoulder ring co-axial with said sleeve and outlet and spaced from both thereof and therewith completing two circumferential eject slots which open into said chamber, and the slot next to the outlet being of greater width than the slot next to the end of said sleeve.

In testimony whereof I have hereunto set my hand this 2nd day of February, 1929.

CHARLES GILBERT HAWLEY.